HYPERVELOCITY JET SYSTEM

Filed April 24, 1968 5 Sheets-Sheet 1

INVENTOR
WILLIAM C. COOLEY
BY Edwin E. Greigg
ATTORNEY

INVENTOR
WILLIAM C. COOLEY
BY Edwin E. Greigg
ATTORNEY

HYPERVELOCITY JET SYSTEM

Filed April 24, 1968 5 Sheets-Sheet 3

INVENTOR
WILLIAM C. COOLEY
BY
ATTORNEY

HYPERVELOCITY JET SYSTEM

Filed April 24, 1968 5 Sheets-Sheet 4

INVENTOR
WILLIAM C. COOLEY
BY
ATTORNEY

HYPERVELOCITY JET SYSTEM

Filed April 24, 1968 5 Sheets-Sheet 5

INVENTOR
WILLIAM C. COOLEY
BY Edwin E. Greigg
ATTORNEY

United States Patent Office 3,468,217
Patented Sept. 23, 1969

3,468,217

HYPERVELOCITY JET SYSTEM

William C. Cooley, Bethesda, Md., assignor to Exotech Incorporated, Rockville, Md.

Continuation-in-part of application Ser. No. 688,266, Dec. 5, 1967. This application Apr. 24, 1968, Ser. No. 723,857
Int. Cl. F41f *1/00;* F41c *21/02;* F41d *9/00*
U.S. Cl. 89—8 8 Claims

ABSTRACT OF THE DISCLOSURE

An apparatus for repetitively producing a hypervelocity fluid jet utilizing a machine gun for firing a series of projectiles along its barrel and an automatic feeding means positioned adjacent the muzzle end of the barrel for feeding a series of tubes of non-explosive booster material, such that a single tube is presented in registry with the bore of the barrel each time a projectile is fired from the machine gun. The projectile impacts the tube of booster material and generates a shock wave therein converting the same into a fluid jet along the axis of the barrel.

This is a continuation-in-part application of my co-pending application Ser. No. 688,266, filed Dec. 5, 1967.

This invention relates to apparatus and a method for producing high velocity fluid jets of material by an impact process, and to apparatus and a method for augmenting the velocity of gun-launched projectiles by immersion in such a high velocity jet.

The principle of shaped charges has undergone investigation for many years, but has always been concerned with the use of detonating explosive materials. The basic principle of jet formation by the collision of fluid or solid surfaces at an angle, however, is much more general, and can be given the name cumulation or the cumulative effect. Cumulation may be defined generally as the concentration of energy into a small volume of fluid by the interaction between two material surfaces, at least one of which behaves as a fluid, when the surfaces collide at an angle. A simple example is the formation under a boat bow of a water jet moving ahead faster than the boat when its hull bottom planes at a small angle above the water surface. This phenomenon is caused by the hydrodynamic motion which produces a stagnation point on the hull a short distance back from the forward water line. Water streamlines above the stagnation streamline are forced to turn upward and reverse direction, conserving their kinetic energy relative to the moving stagnation point, and escaping forward with a velocity of as much as twice the boat velocity.

The main object of this invention is to provide apparatus which can produce this cumulative effect by converging collision of materials in an axi-symmetric geometry to form a pulsed axi-symmetric jet of liquid, gas or plasma which utilizes the kinetic energy of a sabot or piston in an impact process.

Another object of the invention is to provide a velocity augmenter adapted for use with a powder gun, gas gun, or other projectile accelerator which can accelerate the projectile to hypervelocity without shattering or excessively ablating the projectile.

Another object is to provide a device for accelerating projectiles to hypervelocity using simple construction and compact design which can be applied to an anti-missile or anti-aircraft warhead to be used to launch a projectile at a target, or to be used in an anti-tank mine capable of launching a projectile from underground, or to be used for penetrating a pill box or other fortification by firing a projectile through a thick wall.

Further, the present invention can be used with a anti-aircraft or anti-missile gun, capable of sending a projectile to high altitude and with a straighter trajectory and shorter elapsed time to reach the target than previously possible.

Further, the present invention can be used to launch simulated meteoroids to velocities in the range above 20,000 feet per second to permit research on meteoroid impact phenomena.

Further, the present invention can be used to launch projectiles of known mass and geometry to hypervelocity to permit controlled terminal ballistics research on impact phenomena at velocities which can presently only be achieved with chemical explosive or electrically actuated launchers which generally damage the projectile.

Further, the present invention can be used without a solid projectile to provide a pulsed jet of high stagnation pressure for research, military or industrial purposes, in particular, a repetitive firing cannon for use in rock-breaking, tunneling, mining and other uses.

In accomplishing the aforesaid velocity augmentation objects, the present invention utilizes a velocity augmenter comprising one or more stages of augmentation wherein the employed combination of simple equipment includes a propelling means, a driver sabot carrying a detachable projectile, a tubular booster unit, and a casing to hold the components in proper geometrical relationship and to resist the high internal pressures generated during operation.

Other objects and many of the attendant advantages of the present invention will become apparent as the same becomes better understood from the following detailed description had in conjunction with the annexed drawings, wherein, FIG. 1 is a longitudinal sectional view of one embodiment of the velocity augmenter for projectiles in the present invention;

Figure 1:
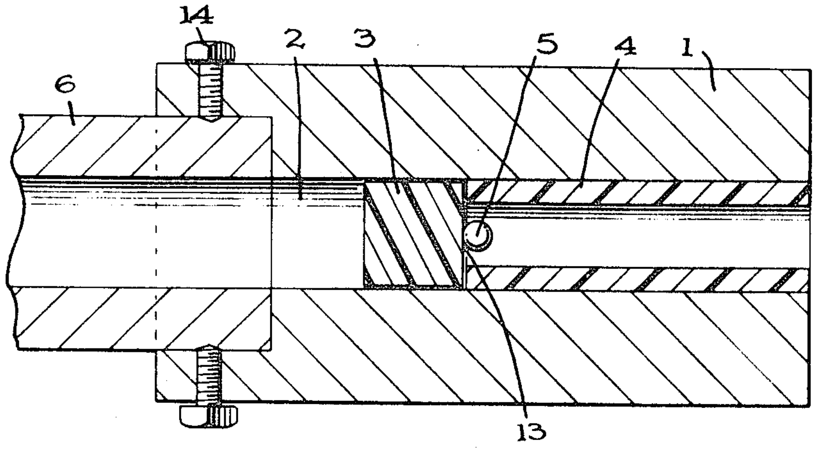
Figure 2:
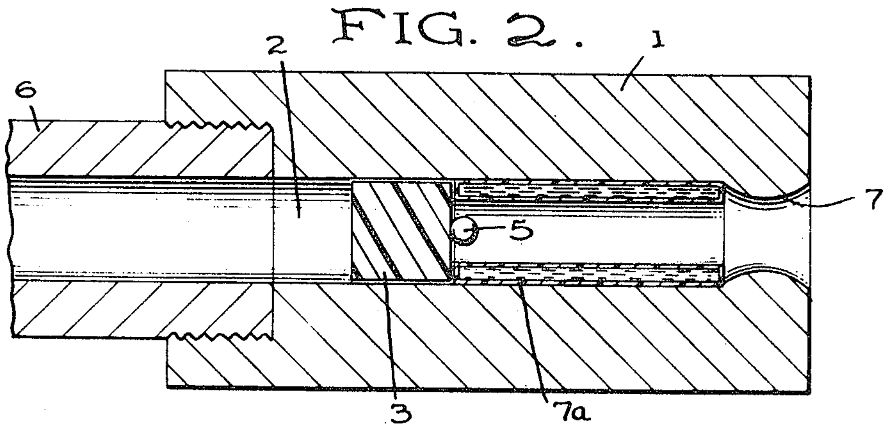
FIG. 2 is a longitudinal sectional view of a further embodiment of the velocity augmenter depicting a converging-diverging nozzle structure in the casing.

Referring now to the drawings, and more particularly to FIG. 1 wherein one form of the present invention is illustrated, 1 designates a casing having a hollow cylindrical shape defining a bore 2. The casing is shown to be mounted on the muzzle 6 of a gun or alternate tubular launcher for accelerating a sabot or piston. This launcher can be any conventional type wherefrom a projectile or piston is accelerated to a velocity of at least 100 feet per second. The casing 1 may be attached to the muzzle 6 of the launcher tube by conventional means such as set screws 14 or directly screwed thereon as shown in FIG. 2. The bore of the muzzle, however, must not be greater than the entrance diameter of the bore 2 in the casing. At the front end of the casing is shown a tubular booster material 4 which is force-fitted into the bore 2. This booster material may be composed of a solid hydrogenous material, such as polyethylene, polypropylene, nylon, Teflon, Kel-F, wax, paraffin, lithium hydride, or a low atomic weight element such as solid hydrogen, lithium or beryllium. A sabot 3 is provided with a detachably mounted projectile 5 on its forward face. The sabot depicted in FIG. 1 is a solid cylindrical mass preferably of dense material, such as steel, tungsten or uranium, although lower density metals, ceramics or plastics may also be used. The sabot 3 has a diameter equal to or slightly smaller than the bore diameter of the casing 1. The projectile 5 may be of any configuration such that its maximum diametral dimension transverse to its longitudinal axis is less than the minimum inside diameter of the booster tube or of the booster fluid at the instant of sabot impact. The projectile may be spherical as shown in FIG. 1 and is secured to the center of the forward face of the sabot or on a small forward protrusion of the sabot by a suitable wax, adhesive or plastic 13.

In operation the sabot with its attached projectile is fired by a conventional gun or other launcher so that the sabot enters the bore 2 of the casing 1. The sabot impacts the booster material, but the projectile 5 enters the booster material without touching it. As the sabot impacts the booster material, a shock wave is generated in the booster material which converts the material to a high pressure, high temperature fluid. The shock pressure in the booster material must exceed the yield strength of the booster material. The shocked booster fluid, then, is constrained by the outer casing 1 to move radially inward where it converges on the center line behind the projectile, and a portion of the fluid turns and escapes in a forward direction, forming a high velocity jet which impinges on the rear face of the projectile and accelerates the projectile relative to the sabot 3. As the shock wave proceeds axially through the booster material, shocked material is continually fed as a fluid radially inward into the region behind the projectile 5 providing a continuing fast jet and a continuous acceleration force on the projectile for a distance of several centimeters. Since the projectile mass is small compared to the mass of shocked booster in the fast jet, the projectile 5 is accelerated substantially. If the booster material is of a much lower density than the sabot material, the shock wave produced within the booster material causes an acceleration of the shocked booster fluid to give it an axial velocity component almost equal to the initial velocity of the sabot 3 and projectile 5. Therefore, as the shocked material expands radially inward, it is initially moving with nearly the same axial velocity as the projectile 5, and the high pressure produced by the fast jet impinging on the rear side of the projectile can continuously accelerate the projectile to a higher velocity. This would not be true if the sabot and booster were of the same material or same density, in which case the axial velocity of the shocked material would be only approximately one-half of the initial sabot velocity, in which case the fast jet velocity would be lower and the velocity augmentation would be less effective. As the shocked booster fluid converges on the center line of the bore 2, it forms approximately a conical zone of converging fluid which acts very much like a Monroe shaped charge in accelerating solid or liquid particles along its axis. In a further embodiment, therefore, the invention can also utilize a solid explosive material as a booster, in which case an explosive detonation wave is produced in the booster by the sabot impact. Still further, the booster unit may consist of solid hydrogen or other solidified gas which is either inserted in the casing bore 2 immediately prior to firing, or is maintained in a solid state by external refrigeration. The booster material could be in a liquid form as well, although special precautions would be necessary as will be discussed hereinafter; for example, liquid hydrogen, liquid helium, water or any other liquid may be used.

In one respect, non-explosive booster material is analogous to a solid or liquid shaped charge of explosive material wherein the role of the detonation wave in the shaped charge has been replaced by the shock wave generated in the booster material by sabot impact. At sufficiently high impact velocities of a sabot, the pressure, temperature and internal energy per unit volume attainable in a shocked booster of non-explosive material can actually exceed those values produced by detonation of a condensed phase explosive. Therefore, without using explosive materials the performance of explosive shaped charges with or without liners can be duplicated or surpassed in the production of high velocity gaseous jets, drag acceleration or projectiles by gaseous jets, or production of jets from a solid liner material. A detailed discussion of the aforementioned principle will be found in "The Shock Plasma Acceleration Technique for Velocity Augmentation" by William C. Cooley, Proceedings of the Seventh Hypervelocity Impact Symposium, vol. I, Techniques, February 1965, pages 102–123.

FIG. 2 depicts a form of the invention which utilizes a converging-diverging nozzle as part of the casing bore 2 to convert a large fraction of the thermal energy in the shock-produced gas into directed kinetic energy by expanding the gas to supersonic velocities in order to accelerate the projectile by drag force to a higher final velocity. The booster material is a liquid and a thin walled container **7*a*** is provided to confine the liquid as shown in FIG. 2.

Figure 3:
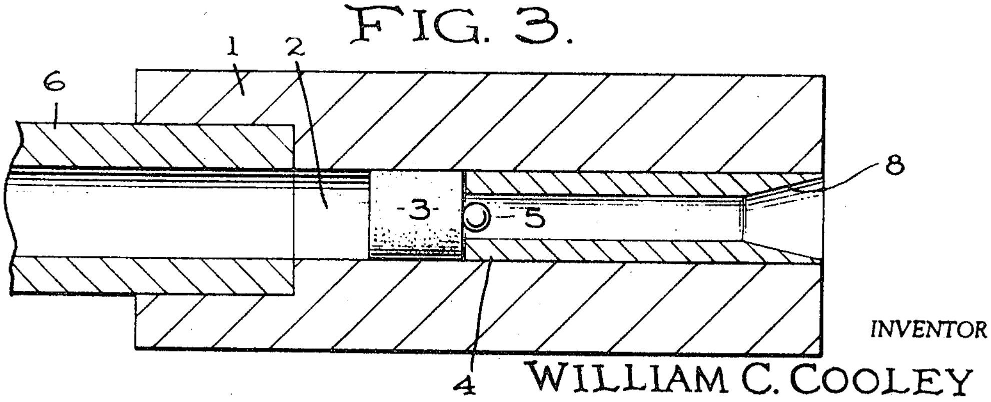
FIG. 3 is a longitudinal section of yet another embodiment of the velocity augmenter with a diverging nozzle structure incorporated in the booster unit.

FIG. 3 depicts a diverging nozzle 8 at the exit end of the booster unit which functions in substantially the same manner as the nozzle 7 in FIG. 2, although the tapered section of the booster unit is consumed by the shock wave at the later stages of the acceleration process.

Figure 4:
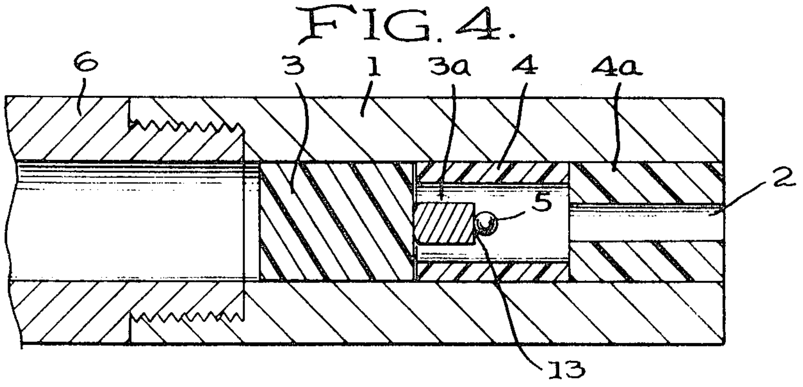
FIG. 4 is a longitudinal section of yet another embodiment of the velocity augmenter utilizing multiple stages.

FIG. 4 illustrates the invention employing multiple stages for achieving increased velocities of the projectile. FIG. 4 depicts a two-stage embodiment of the invention for purposes of clarity. However, any number of stages can be utilized depending upon what the physical limitations of the system will allow. As in FIG. 1, there is shown in FIG. 4 the combination of elements, namely, the casing 1, with a bore 2, a sabot 3, a booster tube 4 and a projectile 5. In addition to these elements, however, there is a second sabot **3*a* and a second booster unit 4*a*. The sabot 3*a* is detachably mounted, as by a wax, adhesive or plastic 13, to the center of the forward face of the first sabot 3. Attached to the second sabot, in the same manner as the two sabots are attached to each other, is the projectile 5. The second booster 4*a* is force-fitted into the casing bore 2 in the same manner as the first booster is fitted into said bore. The two boosters are adjacent each other with the second booster 4*a* located at the exit end of the casing. The inside diameter of the booster 4*a* must be smaller than both the inside diameter of booster 4 and the diameter of sabot 3*a*, but greater than any diametral dimension of projectile 5** transverse to its longitudinal axis. Additional stages consisting of smaller sabots and boosters could be utilized. In principle, therefore, the multi-stage system can accelerate successively smaller stages to successively higher velocities.

Figure 5:
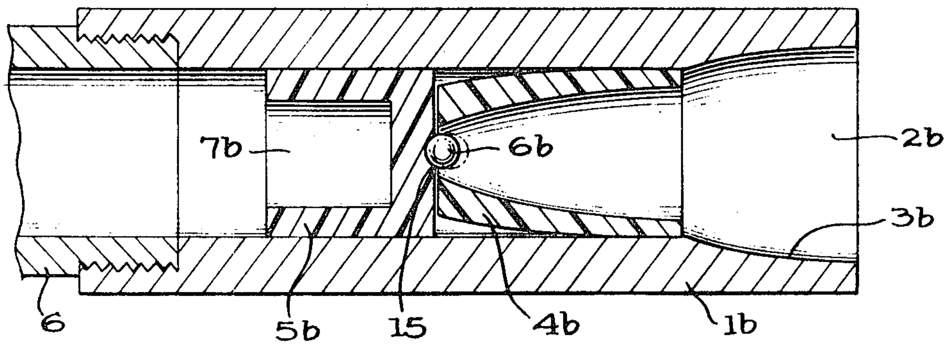
FIG. 5 is a longitudinal sectional view of yet another embodiment of a velocity augmenter in which a variable diameter booster unit is used and a hollow cylindrical sabot is shown as a generally applicable alternate design.

FIG. 5 illustrates a further form of the invention wherein 1*b* is a casing having a cylindrical bore 2*b* which tapers to an increasing diameter at the exit or open end of the casing to form a diverging nozzle. At the point where the bore 2*b* assumes a constant diameter and extending rearwardly therefrom there is provided a booster tube 4*b*. This tube has a constant outside diameter over a portion of its length wherein its outside surface forms a force-fit contact with the bore surface of the casing 1*b*. The booster tube 4*b* has a variable inside diameter decreasing rearwardly and a continuously variable wall thickness. A hollow cylindrical sabot 5*b* formed of the same material as sabot 3 is provided with a detachably mounted projectile 6*b* at the center of its forward face.

The projectile is shown as a sphere which is embedded in a small cavity 15 on the forward face of said sabot 5*b* to a depth of less than one sphere radius. The projectile sphere 6*b* is initially cemented into the cavity 15 with a conventional adhesive having a lower tensile strength than that of the sabot or projectile material. This structure allows the fluid produced by initial impact of the sabot 5 with the booster unit 4*b* to act on a portion of the rear portion of the projectile 6*b* in order to separate it from the sabot 5*b* and permit continued acceleration.

The sabot structure 5*b* is a modification of the sabot 3 in FIG. 1 in that it contains a depression 7*b* in its rear side in order that most of the sabot mass may be in a cylindrical section at the forward face to act as a high inertia platform from which the projectile 6*b* is launched. The design permits the length to diameter ratio of the sabot to remain near unity for greater stability in the gun barrel 6 and, further, to use a dense metallic sabot material and yet keep the sabot mass low enough that the sabot impact velocity is still high.

The variable inside diameter booster unit 4*b*, in FIG. 5, is seen to have its smallest internal diameter at the face where impact by the sabot takes place. However, this is not a necessary condition and the minimum internal diameter may occur at a point spaced away from the plane of impact. Of course, the minimum diameter must be greater than any given diameter of the projectile transverse to its longitudinal axis. This provision of an inside diameter and wall thickness which may vary along the axial direction of the booster unit 4*b* allows for controlling the time variation of pressure application to the projectile 6*b* in order to maximize the velocity increase and yet avoid excessive ablation or fracture of the projectile 6*b*.

Figure 6:
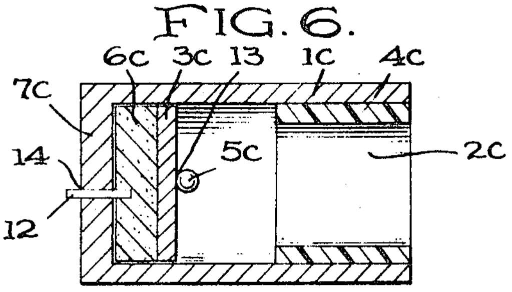
FIG. 6 is a longitudinal sectional view of a chemical explosive projectile launcher and velocity augmenter.

The form of the invention shown in FIG. 6 utilizes a self-contained explosive charge 6*c* located adjacent an end wall 7*c* in the casing 1*c* for launching the sabot or driver plate and projectile 3*c*, 5*c* along the center line of the bore 2*c*. A conventional electrical detonating means 12 is connected to the explosive charge through an opening 14 in the end wall 7*c*. When the charge 6*c* is exploded by the detonating means 12, the cylindrical sabot or driver plate 3*c* is propelled forward till it impacts the booster unit 4*c* whereupon the projectile 5*c* is accelerated forward to a hypervelocity in the same manner as previously described.

Figure 7:
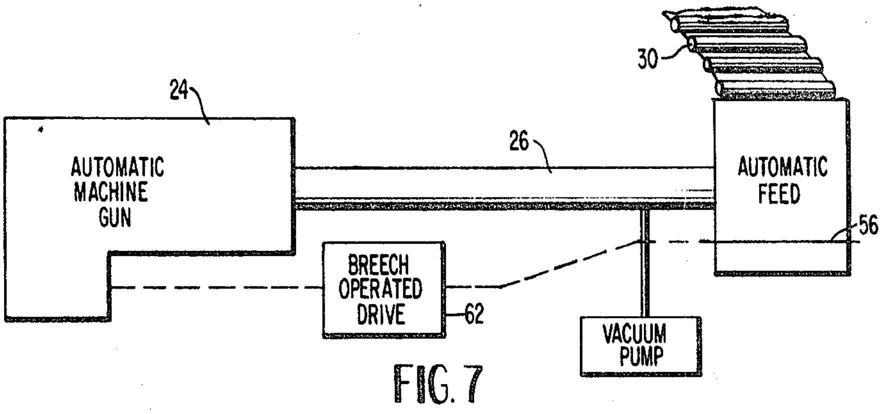
FIG. 7 is a schematic diagram illustrating an automatic system utilizing this invention.
Figure 8:
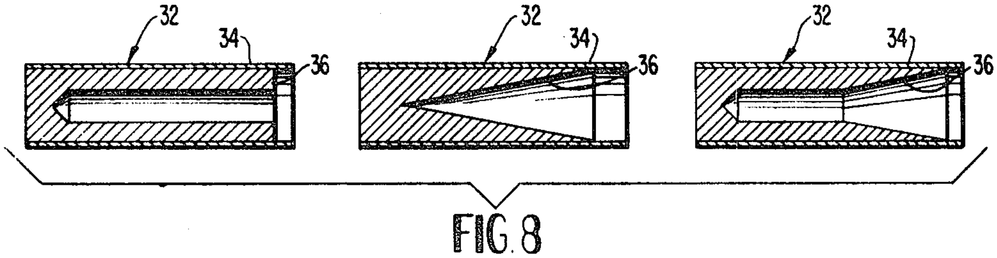
FIG. 8 illustrates several forms of booster tubes used with the invention according to FIG. 7.

FIG. 7 illustrates another form of the invention wherein a plurality of booster tubes are automatically positioned individually at the muzzle end of a conventional barrel of an automatic machine gun. The booster tubes are fed at a rate determined by the breech-operated drive normally associated with automatic machine guns with the result that each booster tube is placed in front of the muzzle at the same time that a cartridge is placed in the rear of the bore for firing. As shown schematically in FIG. 7 there is provided an automatic machine gun 24 which is of conventional design and is preferably of the breech-operated type. At the muzzle end of the barrel 26 there is shown an automatic booster tube feed mechanism 28 which is operated by the breech action of the machine gun. The automatic booster feed mechanism is preferably of the belt-feed type in which case there is provided a belt 30 having a plurality of cartridges 32 arranged therealong in a conventional manner. Each cartridge 32, as shown in FIG. 8, is composed of a shell or hollow casing member 34 of a suitable durable metal into which is force-fitted the booster tube 36 composed of a material as above described with respect to FIGS. 1–6 and having several configurations, as shown. In this case the booster tube 36 is shown having a closed end face facing the rear of the barrel 26. However, the booster tube 36 may be of the straight, cylindrical type as shown in FIG. 1. Where the booster tubes have an end face, it is desirable to employ a vacuum pump connected to the bore of the barrel 26 in order to prevent a pressure build-up between the forward moving projectile or sabot and the end face of the booster tube.

Figure 9:
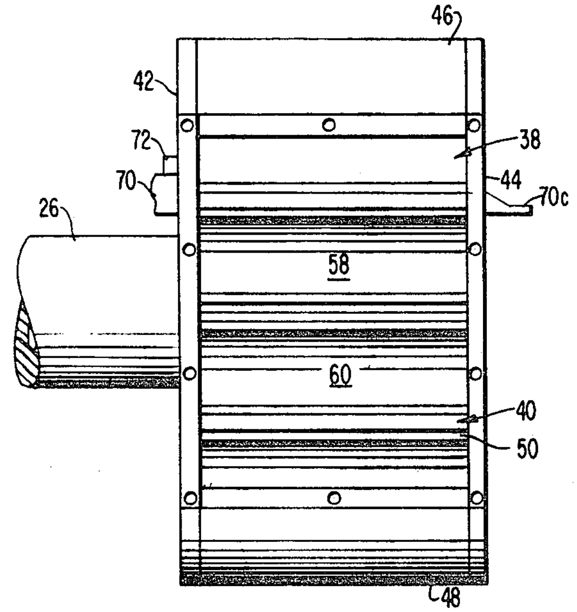
FIG. 9 is a side elevational view of one embodiment utilizing the principles of this invention.

As shown in FIG. 9, an upper rotor or cylinder 38 and a lower rotor or cylinder 40 are mounted in a frame which includes a forward member 42 and a rear member 44, an upper member 46 and a lower member 48. The frame members are connected together by screws to form a chamber 50 in which rotors 38 and 40 are mounted. Attached to the rear frame member 44 is the barrel 26 of the automatic machine gun. Barrel 26 is firmly attached to the rear member 44 by a suitable annular housing member 52.

Figure 10:
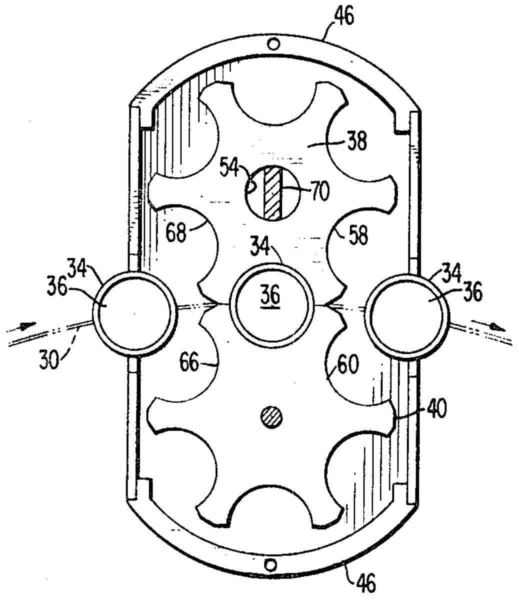
FIG. 10 is a cut-away front view of the apparatus shown in FIG. 9.
Figure 11:
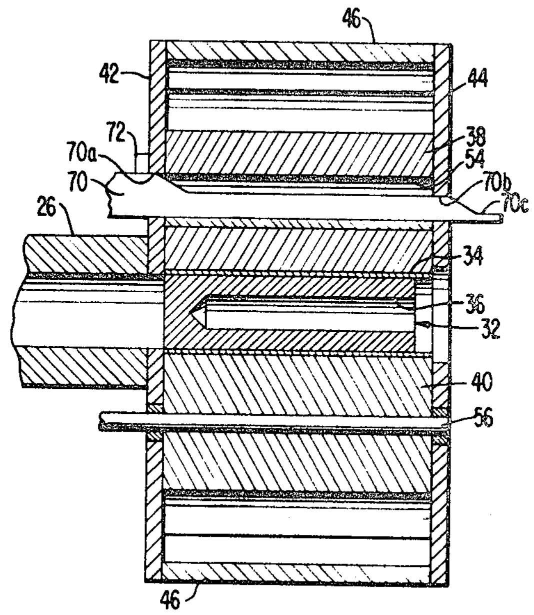
FIG. 11 is a sectional view taken along lines 10—10 in FIG. 10.

Referring now to FIGS. 10 and 11, it will be seen that rotor 38 is mounted for rotation in chamber 50 on a shaft 54. Rotor 40 is mounted for rotation in chamber 50 on a shaft 56 that is journaled in rear frame member 44 and forward frame member 42. Shafts 54 and 56 are mounted in parallel in the frame with shaft 54 being directly above shaft 56. Rotors 38 and 40 have a generally cylindrical configuration, and have a nominal circular cross-section. Formed about the periphery of surface of rotors 38 and 40 and parallel with shafts 54 and 56 are a plurality of concave half cartridge chambers 58, 60. In the preferred embodiment disclosed herein there are six such half chambers evenly spaced around the periphery of each rotor.

FIG. 7 discloses a suitable mechanism for rotating rotors 38 and 40. The shaft 56 is adapted to be rotated by a suitable breech-operated drive linkage 62 connected to the breech of the automatic machine gun. Thus, each time the automatic machine gun presents a cartridge to the bore 26, the shaft 56 is rotated one increment for presenting a booster tube at the muzzle of the bore 26, to be more fully described below.

As rotor 40 is revolved in a clockwise direction as shown in FIG. 10, the half chambers therein mesh with cartridges 32 carried by the cartridge belt 30. As shown, a cartridge 32*a* has been carried between the rotors by a half chamber 64 and a new cartridge 32*b* will be carried between the rotors by a half chamber 66 as the rotation of rotor 40 continues. Upper rotor 38 is not driven directly by the driving means, but is driven in a counterclockwise direction by the meshing of the half chambers in rotor 38 with the cartridges being pulled between the rotors by rotor 40. For example, as cartridge 32*a* is expelled from between the rotors by rotation of rotor 40, a counterclockwise rotation is imparted to rotor 38. If a cartridge is drawn between the rotors, it will mesh with a half chamber 68 in rotor 38 to continue this counterclockwise rotation.

The drive mechanism responsive to the breech operation of the automatic machine gun imparts an intermittent revolution to the rotors. As the rotors reach the position shown in FIG. 10, there is a dwell period corresponding to the dwell period in the automatic machine gun at which time the firing operation takes place. During this dwell period the cartridge 32 is securely held in place between the two opposed half chambers, such as 66, 68. A conventional cartridge is fired from the machine gun at this time. It is desirable that the projectile of such cartridges used be shaped in the form of a solid cylinder as shown in FIG. 1. Each of these cylinders or sabots will operate the same as a cartridge or bore having the same caliber. When they impact the end face 36*a* of the booster tube, a shock wave is set up therein in the manner above described for creating a hypervelocity jet along the axis of the chamber formed by the two half chambers 66, 68. This jet then exits from the chamber along with the sabot.

After each cartridge or sabot is fired along the bore 26, the breech action of the automatic machine gun will impart a rotation to rotor 40. It will be seen from FIG. 10 that such further rotation would not be possible unless means were provided to increase the distance between shafts 54 and 56. The sum of a radius of rotor 38 and a radius of rotor 40 is obviously greater than the distance between the shafts 54 and 56. The outer surfaces of rotors 38 and 40 will thus bind unless the two rotors are separated during rotation. To this end, rotor 38 is mounted on shaft 54 which, in turn, is mounted in the frame for limited movement in a plane containing the axes of the two shafts and in a direction perpendicular to the axes. This translational movement of rotor 38 is sufficient to allow it to move from the position shown in FIG. 10 to a position in which shafts 54 and 56 are at a distance apart greater than the sum of the radii of the respective rotors 38 and 40.

Figure 12:
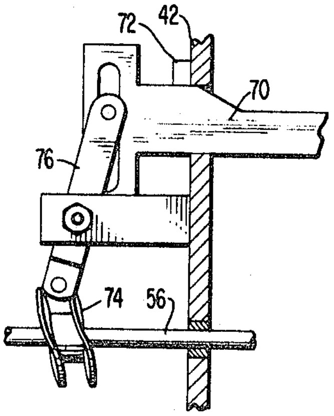
FIG. 12 illustrates a locking mechanism for the apparatus shown in FIG. 9.

The mechanism which controls the translational movement of rotor 38 is disclosed in FIGS. 11 and 12. FIG. 11 discloses the shaft 54 supported in the frame by a shifting cam member 70 inserted longitudinally through a slot in shaft 54. Cam member 70 is longitudinally movable within the slot in shaft 54. In the position shown in FIG. 11, cam member 70 has a high portion 70*a* thereon in contact with a stop 72 that is mounted on rear member 42. An intermediate portion 70*b* on the opposite end of cam member 70 also engages the upper surface of a slot in forward member 44. In this position cam member 70 firmly locks rotor 38 in the position shown in FIG. 10. This locked position, which occurs during the dwell period, effectively seals the chamber which surrounds cartridge 32 during firing. The junction between the half chambers is formed by a pair of flat surfaces 66*a* and 68*a* that have been formed along the line perpendicular to the plane that contains the axes of shaft 54 and shaft 56. In this manner a relatively wide junction surface on each side of cartridge 32 is obtained in order to effectively seal the cartridge chamber and support the cartridge 32. Cam member 70 is thus constructed such that it will apply a predetermined amount of pressure downward on rotor 38 in order to effectively seal the chamber.

After the dwell period during which firing occurs and before rotation of the rotors can begin, rotor 38 must be free to move upwardly. This is accomplished by moving cam member 70 to the left as shown in FIG. 11. As cam member 70 moves to the left, high portion 70*a* and intermediate portion 70*b* are removed from their position in contact with the frame. Intermediate portion 70*b* now comes in line with stop 72 and a lower portion 70*c* is positioned in the slot in frame 44. Rotor 38 is now free to move upwardly the required distance as the outer surfaces of the two rotors begin to bind during rotation.

The movement of cam member 70 must, of course, be synchronized with the rotation of the rotors. A suitable synchronizing mechanism for accomplishing this purpose may be provided in the form of a cam follower and rocker arm assembly connecting the cam member 70 to the shaft 56. As shown in FIG. 12, for example, a guide cam 74 is fixedly secured on the shaft 56 and adapted to guide a pivoted lever arm 76 which has a lost motion connection in a suitable slot provided at the end of the cam member 70. On the other hand, it may be desirable to use the gas-operated mechanism, not shown, associated with the automatic machine gun 24 to reciprocate the cam member 70 rather than to use the mechanical linkage system as described.

Figure 13:
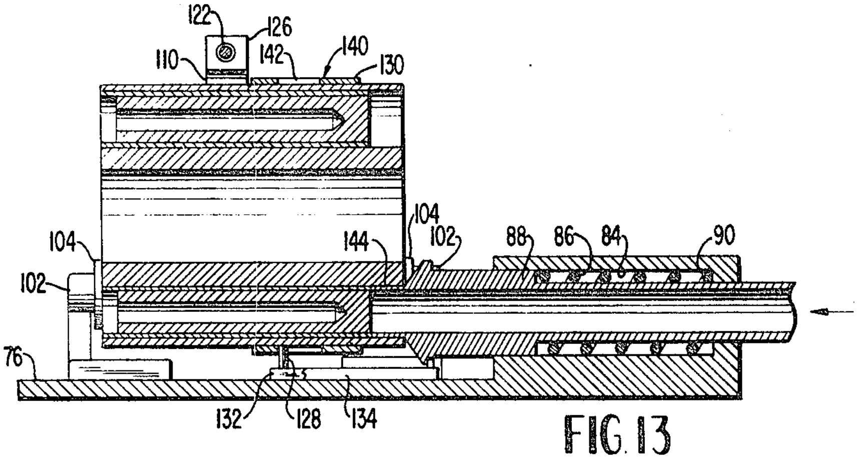
FIG. 13 is a plan view of another embodiment utilizing the principles of this invention.
Figure 14:
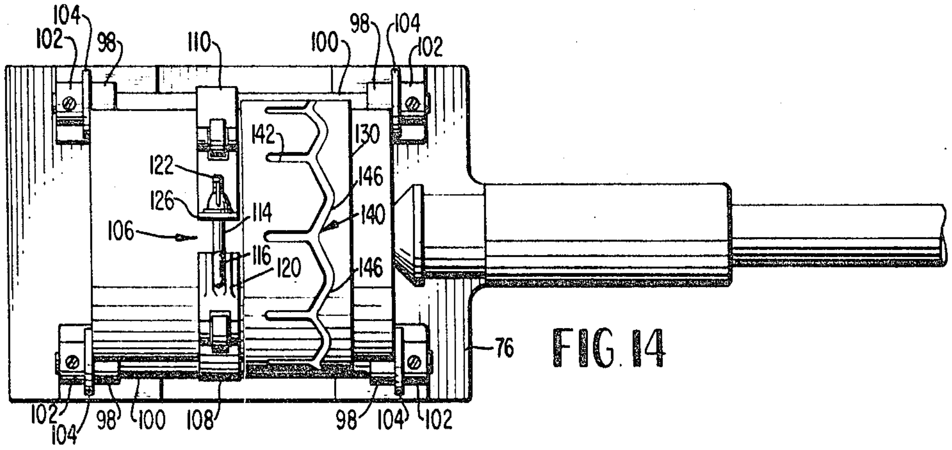
FIG. 14 is a sectional view of the apparatus shown in FIG. 13.
Figure 16:
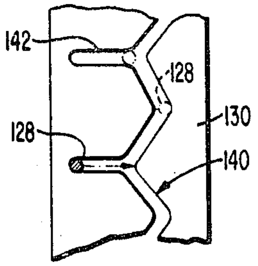
FIG. 16 is a plan view of the indexing track structure used with the embodiment according to FIG. 13.
Figure 15:
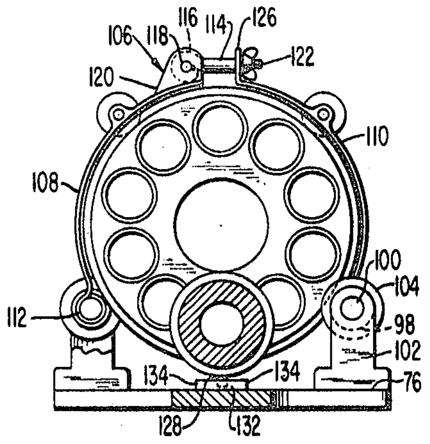
FIG. 15 is an end view of the apparatus shown in FIG. 13.

It is also contemplated that the automatic booster feed mechanism 28 may be in the form of a revolver type mechanism as best shown in FIGS. 13 and 14. A base 76 reciprocably supports a gun barrel 78 which may be a rifle bore. The barrel 78 is reciprocably supported by a barrel guide structure 80. The constructional arrangement is such that the barrel is adapted to slide rearwardly after firing in an automatic recoil when the projectile has left the gun barrel. This is accomplished by an enlarged cylindrical bearing section 82 which is slidably received within a cylindrical counterbore 84 in the guide structure 80, while a reduced diameter bore portion 86 at the forward end of the guide structure provides a bearing for the minimum diameter portion of the barrel 78 and an automatic recoil spring 86 acts between the shoulder 88 of the muzzle portion and a rearwardly directed shoulder 90 at the inner end of the counterbore 84. As a result of this construction, rearward sliding movement of the gun barrel 78 causes the spring 86 to be compressed so that upon the release of the force on the gun barrel, the gun barrel snaps forwardly, automatically, by dissipation of the energy of the loaded spring.

A series of booster tubes 92 such as above described are supported in a series of magazine chambers 94 disposed in uniform annular series on parallel axes in a rotary magazine 96. The booster tubes 92 may be force-fitted within the respective magazine chambers of the rotary magazine. To support the magazine rotatably for successive registration of the magazine chambers 94 with the muzzle of the gun barrel 78, a set of four rollers 98 may be provided for rotatably carrying the magazine by engagement with the end cylindrical margins of the magazine. The rollers are supported in respective axially aligned pairs upon respective shafts 100 carried by respective standards 102 on the base 76 at the opposite ends of the respective shafts 100. Each of the rollers 98 preferably has a flange 104 opposing the respective contiguous end of the magazine 96 to maintain the same against endwise displacement. In this manner the magazine 96 is rotatably cradled on the rollers. In order to hold the magazine against inadvertent upward displacement from the rollers 98 a quick detachable retainer 106 is provided comprising a pair of similar segmental bands 108, 110. Each of the bands has a bearing loop portion 112 engaging above the respective shafts 100 at the opposite sides of the assembly so that the retainer bands can be swung open to clear the magazine for replacement. For this purpose there is provided a pivoted bolt 114 carrying a bearing loop 116 at one end engaging pivotally with a pin 118 carried by and between a pair of upstanding ears 120 on the retainer band 108. The opposite end portion of the connecting bolt 114 has a reduced diameter threaded portion 122 which is engageable within a slot in an upstanding end ear of flange 124 on the retaining band 110. A wing nut threaded onto the end portion 122 of the connecting bolt is provided for tightening the ear against the shoulder at the end of the large diameter shank portion of the bolt 114.

Means are provided for automatically indexing the magazine 96 as an incident to firing of the machine gun. To this end means are provided for interconnecting the gun barrel 78 with rotary magazine 96 for turning the magazine by one magazine chamber increment with respect to the gun barrel at each firing of the gun. An indexing structure 126 including an indexing pin 128, which is actuated by the gun barrel, cooperates in step-by-step indexing relation with an indexing band member 130 carried by the magazine 96. The indexing pin 128 is carried by the forward end portion of a reciprocator which may be in the form of an elongated dove-tail plate or bar 132 longitudinally reciprocably guided by gibs 134 on the base 76 underlying the magazine 96 and with the rear end portion of the reciprocator underlying the muzzle section of the gun barrel. A connecting element 136 projects upwardly from the reciprocator 132 into fixed engagement with the gun barrel muzzle flange 138. Through this arrangement the reciprocator 132 moves with the gun barrel during rearward movement of the latter.

Cooperating with the indexing pin 128 is an indexing track 140 in the indexing member 130. The indexing track is continuous and of a generally sawtooth shape by uniform increments, with each sawtooth section corresponding to an increment of rotary advance of the magazine.

In the full registration of the gun barrel with the magazine ready for firing, the index pin 128 is disposed at the forward end portion of the index track finger 142 corresponding to and parallel with and adjacent to the magazine chamber 94 which is in registry with the gun barrel. Upon firing a sabot by means of the machine gun as above described, a rearward movement to the gun barrel is imparted by a breech operated drive above referred to. The indexing pin 128 travels rearwardly in the indexing track finger 142 along which it is disposed. Coincident with clearance of the tip of the muzzle piece 144 of the gun barrel muzzle from the magazine, the pin 128 strikes a cam surface 146, the starting end of which is offset from the path of rearward movement of the pin 128. Continuing rearward movement of the gun barrel pulls the indexing pin 128 rearwardly against the cam surface 146 and thus causes the indexing member 130 and thereby the rotary magazine 96 to turn in the direction indicated by the arrow.

Upon firing of the last booster tube from the magazine, a loaded magazine can be quickly substituted by withdrawing the tip 144 of the muzzle piece of the gun barrel from the magazine, releasing the retainer mechanism 106 and removing the empty magazine and dropping a loaded magazine in its place. Registration of the indexing pin 128 within one of the track fingers 142 must occur before the magazine is in proper place on the rotary cradle for registration of the gun barrel within one of the magazines. The retaining mechanism then is secured and the gun is again in condition for firing and automatic indexing.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

I claim:

1. A method for creating a hypervelocity jet comprising the steps of securing a tube of non-explosive booster material coaxially within the bore of a cylindrical casing having an open end, and impacting one end of said booster tube, whereby a shock wave is generated in said booster tube and said tube is converted into a fluid jet along the axis thereof.

2. A method for creating a hypervelocity jet comprising the steps of force-fitting a sleeve of non-explosive booster material coaxially within the bore of a cylindrical casing having an open end and impacting the end of said sleeve remote from said open end of said casing whereby a shock wave is generated within said sleeve and said sleeve is converted into a fluid jet along the axis thereof.

3. A method for creating a hypervelocity fluid jet comprising the steps of force-fitting a sleeve of non-explosive booster material coaxially within the bore of a cylindrical casing having an open end, impacting the end of said sleeve remote from said open end of said casing with a sabot having a higher density than the density of said sleeve, whereby a shock wave is generated in said sleeve and said sleeve is converted into a fluid jet along the axis thereof.

4. In a system for repetitively producing a hypervelocity fluid jet the combination comprising, a machine gun means having a barrel for repetitively firing a series of projectiles along said barrel, a plurality of tubes of non-explosive booster material, each of said tubes having substantially the same caliber as the caliber of each of said projectiles fired from said machine gun, feeding means positioned at the muzzle end of said barrel for presenting a single one of said tubes of booster material in registry with the bore of said barrel for each projectile fired from said machine gun, whereby said projectile impacts said tube of booster material for generating a shock wave therein and converting said booster material into a fluid jet along the axis of said bore of said barrel.

5. In a system according to claim 4, wherein each of said tubes of booster material is supported in an open-ended casing member, and a belt means for feeding each casing member to said feeding means.

6. In a system according to claim 4, wherein said feeding means comprises a rotary magazine having circumferentially arranged cartridge chambers and each of said tubes of non-explosive booster material being supported in a respective one of said chambers.

7. In a system for repetitively producing a hypervelocity fluid jet, the combination comprising, a barrel means, means for firing a series of projectiles along said barrel, feeding means positioned at the muzzle end of said barrel, a plurality of tubes of non-explosive booster material positioned in said feeding means, means responsive to said means for firing said series of projectiles for actuating said feeding means to present a single one of said tubes of booster material in registry with the bore of said barrel each time a projectile is fired, whereby said projectile impacts said tube of booster material for generating a shock wave therein and converting said booster material into a fluid jet along the axis of said barrel.

8. In a system for repetitively producing a hypervelocity fluid jet, the combination comprising, a barrel means, means for firing a series of projectiles along said barrel, feeding means positioned at the muzzle end of said barrel, a plurality of tubes of non-explosive booster material, a supply means supporting said tubes of booster material, said supply means engaging said feeding means, and means responsive to said means for firing said series of projectiles for actuating said feeding means to present a single one of said tubes of booster material in registry with the bore of said barrel each time a projectile is fired, whereby said projectile impacts said tube of booster material for generating a shock wave therein and converting said booster material into a fluid jet along the axis of said barrel.

References Cited

UNITED STATES PATENTS

| | | | |
|---|---|---|---|
| 57,607 | 8/1866 | White | 89—8 |
| 2,835,171 | 5/1958 | Lyon | 89—13 |
| 3,212,208 | 10/1965 | Persechino et al. | 89—14 X |
| 3,249,046 | 5/1966 | Ballhan et al. | 102—22 |
| 3,262,367 | 7/1966 | Martwick et al. | |
| 3,412,554 | 11/1968 | Voitsekhousky | 60—54.5 |

SAMUEL W. ENGLE, Primary Examiner

U.S. Cl. X.R.

42—76; 89—13, 33